UNITED STATES PATENT OFFICE.

RUDOLPH BERENDES, OF ELBERFELD, GERMANY, ASSIGNOR TO FARBENFABRIKEN VORM. FRIEDR. BAYER & CO., OF ELBERFELD, GERMANY, A CORPORATION OF GERMANY.

CALCIUM SALT OF ACETYL SALICYLIC ACID AND PROCESS OF MAKING SAME.

1,020,121. Specification of Letters Patent. Patented Mar. 12, 1912.

No Drawing. Application filed May 17, 1911. Serial No. 627,811.

*To all whom it may concern:*

Be it known that I, RUDOLPH BERENDES, doctor of philosophy, chemist, citizen of the German Empire, residing at Elberfeld, Germany, have invented new and useful Improvements in Calcium Salts of Acetyl Salicylic Acid and Processes of Making Same, of which the following is a specification.

My invention relates to the manufacture and production of a new and valuable pharmaceutical compound being the calcium salt of acetyl salicylic acid having most probably the formula:

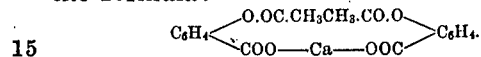

It is obtainable by treating a compound containing the radical of acetyl salicylic acid, $CH_3.COOC_6H_4COO-$, such as acetyl salicylic acid itself, or an alkaline salt of acetyl salicylic acid, with a calcium compound, such as a calcium salt, or an alcoholate of calcium.

In order to illustrate the new process more fully the following example is given, the parts being by weight: 80 parts of calcium acetate are dissolved in 200 parts of water and the resulting solution is added to a solution of 180 parts of acetyl salicylic acid in 1500 parts of methyl alcohol. The new calcium compound is filtered off and dried. It crystallizes from alcohol in the shape of colorless almost tasteless needles which are easily soluble in water furnishing a neutral solution. A yellowish-gray precipitate is obtained with ferric chlorid. It is a valuable soluble substitute for acetyl salicylic acid. The new product can also be obtained by treating an alkaline salt of acetyl salicylic acid with a calcium salt or by treating acetyl salicylic acid with an alcoholate of calcium.

I claim:

1. The process of producing the calcium salt of acetyl salicylic acid which comprises treating a compound containing the radical of acetyl salicylic acid,

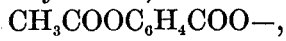

with a calcium compound.

2. The process of producing the calcium salt of acetyl salicylic acid which comprises treating acetyl salicylic acid with a calcium compound.

3. The herein-described process for producing the calcium salt of acetyl salicylic acid, which process consists in treating acetyl salicylic acid with a calcium salt, substantially as described.

4. The process of producing the calcium salt of acetyl salicylic acid which consists in dissolving calcium acetate in water, adding thereto a solution of acetyl salicylic acid in alcohol, and filtering off the calcium compound.

5. The process of producing the calcium salt of acetyl salicylic acid which consists in dissolving 80 parts of calcium acetate in 200 parts of water, adding thereto a solution of 180 parts of acetyl salicylic acid in 150 parts of methyl alcohol, and filtering off the calcium compound.

6. The herein-described new calcium salt of acetyl salicylic acid having most probably the formula:

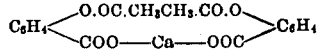

which crystallizes from alcohol in the shape of colorless almost tasteless needles easily soluble in water, giving a yellowish-gray precipitate with ferric chlorid and being a valuable soluble substitute for acetyl salicylic acid, substantially as described.

In testimony I have hereunto set my hand in the presence of two subscribing witnesses.

RUDOLPH BERENDES. [L. S.]

Witnesses:
    CHAS. J. WRIGHT,
    ALFRED HENKEL.